Dec. 7, 1965   D. L. HALL ETAL   3,221,543
WEIGHT AND CENTER OF GRAVITY COMPUTING APPARATUS
Filed Sept. 18, 1961   2 Sheets-Sheet 1
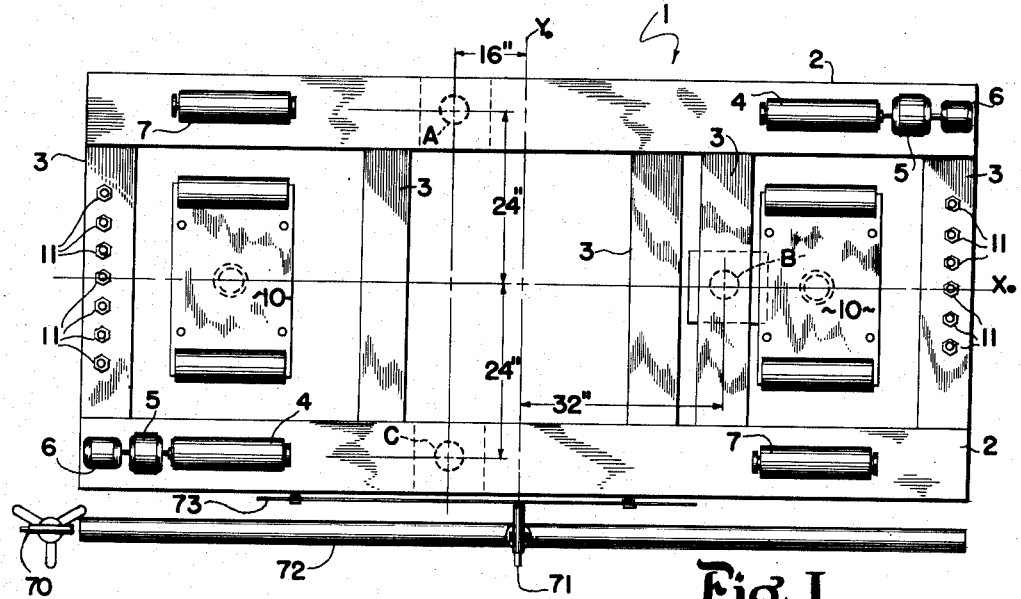
Fig. I
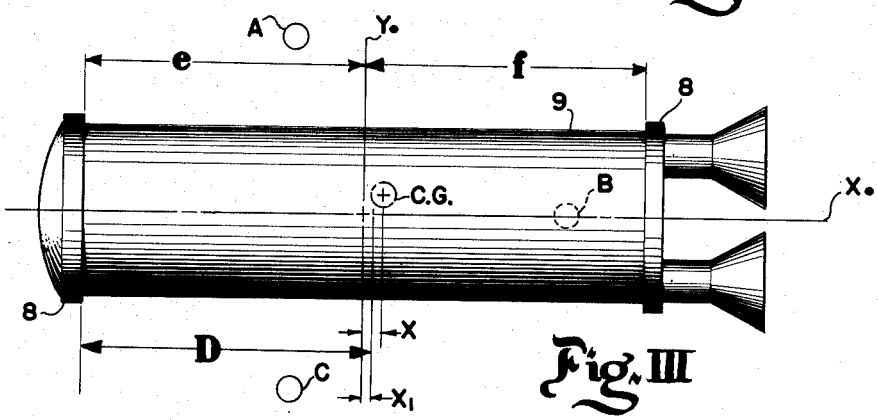
Fig. III
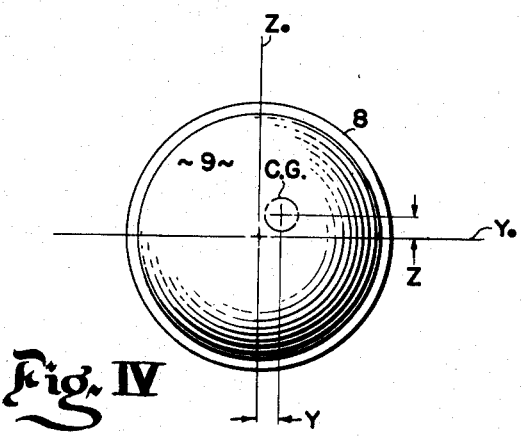
Fig. IV
INVENTORS.
DONIVAN L. HALL
ROBERT F. ORR
BY ROGER B. WILLIAMS JR.
ATTORNEYS

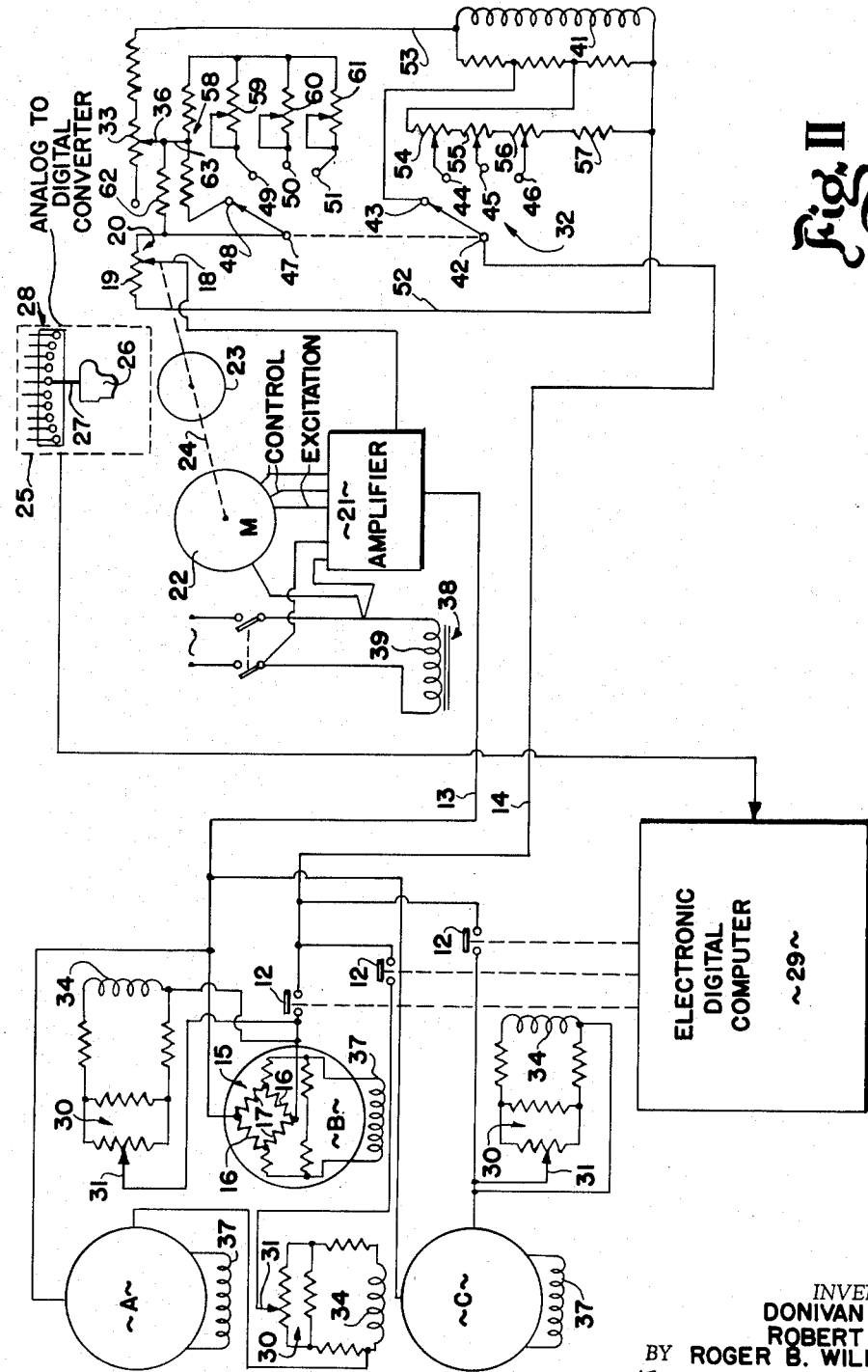
Fig. II
INVENTORS.
DONIVAN L. HALL
ROBERT F. ORR
ROGER B. WILLIAMS JR.
BY *Marshall, Wilson + Click*
ATTORNEYS

3,221,543
WEIGHT AND CENTER OF GRAVITY COMPUTING APPARATUS

Donivan L. Hall, Robert F. Orr, and Roger B. Williams, Jr., Toledo, Ohio, assignors to Toledo Scale Corporation, Toledo, Ohio, a corporation of Ohio
Filed Sept. 18, 1961, Ser. No. 138,882
1 Claim. (Cl. 73—65)

This invention relates to weight and center of gravity determining systems and more particularly to an automatic electrical system in which an electronic digital computer calculates and records the total weight of an object from a plurality of force measurements and computes and records the position of the center of gravity of such object.

Heretofore, systems for determining weight and center of gravity have not been automatically operable, have not printed a record, and have not operated on a digital basis.

Accordingly, the objects of this invention are to improve weight and center of gravity determining systems, to provide automatic operation for such systems, to provide record printing means in such systems, to provide digital computation in such systems, to increase the precision of such systems, and to simplify the construction of such systems.

One embodiment of this invention enabling the realization of these objects is a combination of an electronic weighing scale system, the analog to digital converter disclosed in U.S. Patent No. 2,948,463 issued August 9, 1960 to M. C. Yeasting for changing the analog output information from the weighing scale system into digital form suitable for operating an electronic digital computer, and such computer which has internal programming, an arithmetic unit, a storage section and an input-output writer in the form of an electric typewriter.

In accordance with the above, one feature of this invention resides in a completely automatically operable system, the computer programmer cycling the system through its various steps.

Another feature resides in the provision of printing means in the system, the electric typewriter printing among other things the total weight of an object and the position of the center of gravity of such object.

A further feature involves the provision of a system operating on a digital basis, the unique combination of the converter changing the information from the weighing scale system into digital form and the electronic digital computer accepting such digital information for use in locating accurately the center of gravity of an object.

The above and other objects and features of this invention will be appreciated more fully from the following detailed description when read with reference to the accompanying drawings wherein:

FIG. I is a plan view of a load receiving platform in a weight and center of gravity determining system according to this invention;

FIG. II is a schematic wiring diagram showing an electronic weighing scale system in combination with an analog to digital converter and an electronic digital computer;

FIG. III is an elevational view of a solid propellant rocket motor provided with handling or rolling rings receivable by the load receiving platform illustrated in FIG. I; and FIG. IV is an end view of the rocket motor shown in FIG. III.

These specific figures and the accompanying description are intended merely to illustrate the invention and not to impose limitations on the claims.

Referring to the drawings, an automatic electrical system for determining the weight and center of gravity of an object embodying the invention includes a load receiving platform 1 comprising a pair of longitudinally extending I-beams 2 connected by cross members 3 and supported upon three strain gage load cells A, B and C arranged in the form of a triangle. The platform 1 is of a size to accommodate solid propellant rocket motors in the range of 5,000 to 15,000 pounds. Any electrical or transducer means may be substituted for the strain gage load cells which will produce an output voltage which is a function of load.

The platform 1 is provided with a pair of power rollers 4, driven through reducers 5 by hydraulic motors 6, and a pair of idler rollers 7, the power rollers 4 and the idler rollers 7 being arranged transversely or laterally opposite each other in pairs for the reception of handling or rolling rings 8 on a solid propellant rocket motor 9 (FIG. III). The two power rollers 4 and the two idler rollers 7 are support rollers located to present a full bearing surface to the handling or rolling rings 8, the total load of the rocket motor 9 being distributed to the three loading points, i.e., the three load cells A, B and C. Floor-mounted, hydraulic-operated lifts 10 function to apply the rocket motor 9 to the support rollers 4 and 7 evenly and without shock. The support rollers 4 and 7 are so aligned that the axis of the cylindrical rocket motor 9 placed upon such rollers is automatically aligned with the longitudinal axis $Xo$ of the platform 1, i.e., the longitudinal fixed reference axis of the platform 1. $Yo$ is the transverse fixed reference axis of the platform 1 and $Zo$ (FIG. IV) is the vertical fixed reference axis of the platform 1 which as viewed in FIG. I is at the point of intersection of axes $Xo$ and $Yo$. Associated with the platform 1 are emergency floor-mounted hold-down bolts 11, the nuts on which are spaced above the platform, that prevent substantial movement of the platform 1 in the event of accidental firing of the rocket motor 9.

The strain gage load cells A, B and C are connectable in circuit successively, by means of switch means comprising relay contacts 12 (FIG. II), to leads 13 and 14 of a weighing scale servo system. Each of the load cells A, B and C comprises a resistance wire strain gage bridge 15, only one of which is shown, having resistance elements 16 in two of its legs and resistance elements 17 in the other two legs. The bridges 15 are of an ordinary type used in gages available for measuring strain wherein the elements 16 and 17 are adapted to change in resistance with changes in the condition to be measured, i.e., load applied to the load cells. An output voltage or force signal is developed between the leads 13 and 14 which is a function of the load applied to which ever one of the three load cells A, B and C happens to be connected in circuit therewith. The servo system shown in FIG. II together with one of the load cells is an electronic weighing scale, the servo system reading out in analog fashion the load cell voltage in terms of weight.

Leads 13 and 14 are operatively connected, through circuitry described hereinafter, to a sliding contact 18 and to constant resistance 19, respectively, of a feedback potentiometer 20. An amplifier and motor control device 21 is connected in circuit with the lead 13 and controls the operation of a servo motor 22 which both positions a rotatable chart 23 and the sliding contact 18 of the potentiometer 20 through a mechanical connection 24. The chart 23, which is shown and described in detail in the above U.S. Patent No. 2,948,463, is rotated through increments of angle that are proportional to increments of weight applied to the scale and is provided with molded graduations or indicia that are sensed by an analog to digital converter 25 which also is shown and described in detail in the above U.S. Patent No. 2,948,463.

The analog to digital converter 25, in brief as disclosed in the above patent, includes a plurality of cooperating permutation members which are individually urged in a direction to engage relatively raised and depressed surfaces on the chart 23 and are retracted from engagement with the chart by means of a common pawl that selectively engages one of two notches in each of the permutation members so as to retract such members without disturbing their relative positions. The common pawl in fully retracted position locks the permutation members against relative motion so that notched peripheries of the members may be searched for aligned notches, corresponding to the relative positions as determined by a permutation code, by search pawls carried on pawl carriers, there being one search pawl and pawl carrier for each decade in the weight reading. One of the pawl carriers is shown fragmentarily as pawl carrier 26 in FIG. II. As disclosed in the above patent, a movable commutator contact 27 is attached to each of the pawl carriers 26 and completes a circuit through one of ten contacts 28 (0 and 1–9) for an electrical readout, i.e., there are a movable commutator contact 27 and ten contacts 28 for each decade in the weight reading. If a "two" is sensed by the analog to digital converter 25 in a particular decade a circuit is completed through the "two" contact 28 for such decade, if a "zero" is sensed, a circuit is completed through the "zero" contact 28 for such decade, etc. In other words, the analog output information from the weighing scale is changed by the converter 25 to digital form suitable for operating an electronic digital computer 29 in circuit with the converter 25.

The bridges 15 each has an output lead connectable through its respective relay contact 12 to the lead 14 and in circuit with each of such output leads there is provided a zero adjust potentiometer 30 having a sliding contact 31. A double deck selector switch 32 and a span adjust resistance 33, having a sliding contact 36, are connected in the order named in circuit with the lead 14. The strain gage bridges 15 and the zero adjust potentiometers 30 are supplied with alternating current from the secondary windings 37 and 34, respectively, of a power transformer 38 that has its primary winding 39 connected to a source of alternating current. The feedback potentiometer 20 is energized by the secondary windings 41 of the power transformer 38, the windings 41 being connected with the adjustable resistance 33 across the feedback potentiometer 20.

Each of the bridges 15 forms a balanceable network that is adapted to be unbalanced in response to changes in load applied to the respective load cell, i.e., the network develops an output voltage between the leads 13 and 14 which is a function of load applied to the connected one of the load cells A, B, and C. This output voltage opposes the output voltage of the feedback potentiometer 20, the potentiometer 20 driven by the servomotor 22 serving as a continuously automatically adjustable voltage source. The output voltage of the connected one of the bridge networks opposes the output of the feedback potentiometer circuit connected thereto to determine the flow of current through the amplifier and motor control device 21. An unbalance of the output voltages results in operation of the servomotor 22 to position the chart 23 and the contact 18 until the opposing voltages are equal whereby input voltage to the amplifier 21 is reduced to null.

Adjustments of the contacts 31 of the zero adjust potentiometers 30 result in changes in the positions of the contact 18 to produce a balance for predetermined conditions to be measured. The positions of the contact 18 are representative of the conditions measured, and a changing of these positions by adjustments of the contacts 31 merely results in indications of the values from a different zero point, i.e., the zero adjust potentiometers 30 function to adjust the weighing scale chart 23 to zero indication when no load is upon the load cells A, B and C. In operation, the load cells are switched into the servo system one at a time and the zero adjust potentiometers 30, one of which is provided for each of the load cells, are so adjusted that the weighing scale chart 23 indicates zero when no load is upon the platform 1, i.e., the weight of the platform 1 and its adjuncts is tared off. The chart 23 indicates the balancing or output voltage of the feedback potentiometer circuit in terms of weight. The span adjust resistance 33 functions to adjust the voltage across the feedback potentiometer 20.

When the selector switch 32, which comprises a first deck 42 having four terminals or contacts 43, 44, 45 and 46 and a second deck 47 having four terminals or contacts 48, 49, 50 and 51 is in the position shown in FIG. II and when the zero adjust potentiometers 30 and the span adjust resistance 33 are properly adjusted, the weight of any load that is placed upon a connected load cell A or B or C and that is within the capacity of the chart 23 is indicated by the chart 23 and read out by the converter 25 is digital form. Such capacity is so chosen that suitable sensitivity of indication is given. When very heavy loads are weighed, the capacity of the weighing scale system is increased without decreasing the sensitivity of indication by means of the selector switch 32 and the circuit associated therewith, i.e., electrical "unit weights" are used.

The decks 42 and 47 of the selector switch 32 move as a unit and when contacts 43 and 48 of the switch are closed, as shown in FIG. II, the feedback potentiometer 20 is energized through leads 52 and 53 by the secondary windings 41 to such a level that the output voltage of the potentiometer can exactly balance the output voltage of the connected bridge 15 for any load within the capacity of the chart 23. Contacts 44, 45 and 46 of the first deck 42 of the switch 32 are connected to variable resistances 54, 55 and 56, respectively, which resistances are connected in turn along with a constant resistance 57 in parallel across the secondary windings 41, and in parallel across the feedback potentiometer 20. The variable resistances are adapted to be manually adjustable and their sliders are so positioned, as determined by trial, that the voltage between contacts 43 and 44, for example, is equal to the voltage change of the feedback potentiometer 20 from zero to full chart capacity. By turning the selector switch 32 to close contact 44 such additional fixed increment of voltage may be added to the output voltage of the feedback potentiometer 20 to change, e.g., to double, the capacity of the weighing scale system. The resistances 54, 55 and 56 may be pictured as one resistance in parallel across the feedback potentiometer 20 and the movable contact of the first deck 42 of the switch 32 as a slider contacting such resistance. Thus, with a load equal to chart capacity upon the connected load cell and with the selector switch 32 turned to close contact 44 the chart 23 indicates zero. Similarly, the selector switch 32 may be turned to pick off fixed increments of voltage from contacts 45 and 46, the voltage added by closing contact 45 being larger than the one added by closing contact 44 and the voltage added by closing contact 46 being larger than the one added by closing contact 45.

As shown in FIG. II, the selector switch 32 may be used to pick off and add any one of three fixed increments of voltage to the output voltage of the potentiometer 20 to increase the capacity of the weighing scale, for example, from 1000 pounds capacity with contact 43 closed, to 2000 pounds capacity with contact 44 closed, to 3000 pounds capacity with contact 45 closed, or to 4000 pounds capacity with contact 46 closed or, for example, to increase the capacity of the weighing scale from 2000 pounds capacity with contact 43 closed, to 4000 pounds capacity with contact 44 closed, to 6000 pounds capacity with contact 45 closed, or to 8000 pounds capacity with contact 46 closed. Steps of any suitable size may be chosen by the proper design of the circuit which comprises the resistances 54, 55, 56 and 57 and additional steps may be added.

The span adjust resistance 33 functions to adjust the voltage across the feedback potentiometer 20. The load cell output voltage is not linear over the entire load cell range which may be utilized by increasing the capacity of the weighing scale system beyond that of the chart 23. In a weighing scale, an error in linearity may be defined as a half capacity load indication which is not equal to the average of the zero and full capacity load indications. The second deck 47 of the selector switch 32 and the circuit associated therewith are used to adjust the span every time that the capacity of the scale is changed, i.e., the second deck 47 functions to adjust the voltage across the feedback potentiometer 20 so that it always matches the load cell output voltage.

The contacts 48, 49, 50 and 51 of the second deck 47 of the selector switch 32 are connected to resistances 58, 59, 60 and 61 respectively, which may be connected in parallel by the switch across a constant resistance 62 connected in series between the span adjust resistance 33 and the potentiometer 20. The decks 42 and 47 of the selector switch 32 move as one. When contacts 43 and 48 are closed, sliding contact 36 is used to adjust the span. When contacts 44 and 49 are closed, current is shunted around resistance 62 through a lead 63 and through resistance 59. Similarly, when contacts 45 and 50 are closed and when contacts 46 and 51 are closed, current is shunted around resistance 62 through the lead 63 and through resistances 60 and 61, respectively. Variable resistances 59, 60 and 61 are adapted to be manually adjustable and their sliders are so positioned, as determined by trial, that the span is automatically and correctly adjusted every time that the capacity of the weighing scale system is varied to compensate for the non-linearity in the load cell output over the load cell range. For the sake of simplicity, it is assumed that that part of the weight of the rocket motor 9 borne by any one of the load cells A, B and C is within the capacity of the chart 23. Accordingly, all of the output information from the weighing scale is changed by the converter 25 into digital form suitable for operating the electronic digital computer 29.

An example of a suitable electronic digital computer 29 is a Monroe Company "Monrobot IX" which has internal programing, an arithmetic unit, a storage section and an input-output writer in the form of an electric typewriter. The computer 29 can perform the basic arithmetic operations of add, subtract, multiply and divide. External data, except for weighing scale readouts, is entered through a keyboard. Data can enter fourteen registers. Programing is controlled by plugboards and each program may consist of up to fifty-two steps and is performed by a stepping switch. In operation, the rocket motor 9 is so placed upon the platform 1 that the rolling rings 8 are received by the power rollers 4 and the idler rollers 7, the zero adjust potentiometers 30 being so adjusted prior to loading that all of the three load cell outputs prior to loading produce zero indication on the chart 23, i.e., the weight of the load receiving platform 1 and its adjuncts is tared off. As soon as the computer 29 starts its cycle, the computer's stepping switch connects one of the load cells A, B and C into the servo system by completing a circuit to the coil of the relay of one of the relay contacts 12, the analog to digital converter 25 soon after completes the circuits to the computer 29 for an electrical readout and the computer 29 stores and types the force measurement. This procedure is repeated two more times to store and type the force measurements made by the other two load cells. The stepping switch then causes a light to be lit, indicating that the rocket motor 9 should be rotated ninety degrees. Rotation of the rocket motor 9 is accomplished by means of the hydraulic motors 6 and reducers 5 connected to the power rollers 4. The above procedure then is repeated so that finally six force measurements have been stored and typed, the load cells A, B and C being connected successively into the servo system before rotation of the rocket motor 9 and again after such rotation.

The computer program continues. First the computer computes the average total weight of the combination of the rocket motor 9 and the handling rings 8 by adding the above six force measurements and dividing by two and then solves for the X, Y and Z coordinates of the center of gravity of the combination of the rocket motor 9 and the handling rings 8. Each of the center of gravity planes with respect to the $Xo$, $Yo$ and $Zo$ platform axes is printed out after the calculations using the following formulas:

X coordinate

Taking moments of the vertical forces about $Yo$ $$XW - 16(A+C) + 32B = 0$$

$$X = 16 \left[ \frac{(A+C-2B)}{W} \right] \text{ inches}$$

wherein W is the above average total weight, 16 and 32 (entered through the keyboard) are the physical dimensions shown in FIG. I, and A, B and C are the force measurements made before rotation of the rocket motor 9 by load cells A, B and C.

Y coordinate

Taking moments of the vertical forces about $Xo$ $$YW - 24A + 24C = 0$$

$$Y = \frac{24(A-C)}{W} \text{ inches}$$

wherein W is the above average total weight, 24 (entered through the keyboard) are the physical dimensions shown in FIG. I, and A and C are the force measurements made before rotation of the rocket motor 9 by load cells A and C.

Z coordinate

After rotating the rocket motor 9 ninety degrees about axis $Xo$, taking moments of the vertical forces about $Xo$ $$Z = \frac{24(A-C)}{W} \text{ inches}$$

wherein W, 24, A and C are the same as above indicated in connection with the Y coordinate.

If it is desired, the operator may enter the weight dimensions of the handling rings 8 plus the distances relating the handling rings to the platform $Yo$ axis into the computer keyboard. The resulting answer, using the following formula, gives the center of gravity of the rocket motor 9 without rings.

$X_1$ corrected coordinate (FIG. III)

The coordinates of the center of gravity of the rocket motor alone may be determined as follows:

$$XW = X_1[W - (W_1 + W_2)] + fW_2 - eW_1$$

$$X_1 = \frac{XW + eW_1 - fW_2}{W - (W_1 + W_2)} \text{ inches}$$

wherein

X and W are as indicated above,
$W_1$ is the weight of the left hand handling ring as viewed in FIG. III,
$W_2$ is the weight of the right hand handling ring as viewed in FIG. III, and
$e$ and $f$ are the physical dimensions shown in FIG. III.

The Y and Z coordinates need not be corrected if the handling rings 8 are statically balanced.

The uncorrected center of gravity planes, the intersection of which is indicated as "C.G." in FIGS. III and IV, are with respect to the $Xo$, $Yo$ and $Zo$ platform axes. Projection of the longitudinal center of gravity location to the rocket motor 9 is accomplished as follows:

An alignment scope 70, which projects collimated light beams, is aligned to be perpendicular to the platform axis Yo. An optical transit 71 then is aligned to coincide with the platform axis Yo as shown in FIG. I, the transit being mounted on a tooling bar 72 which functions as a stand along which the transit is slidable. This makes the optical transit 71 square with the projected light beams from the alignment scope 70. The position of the transit 71 on the tooling bar 72 is noted by reading a scale on a steel rule 73 carried by the platform 1 and then the transit 71 is moved along the tooling bar 72 a distance $X_1$ (corrected coordinate—FIG. III) and is realigned by means of the alignment scope 70 to be parallel to the platform axis Yo. An image of the transit's crosshair is projected onto the rocket motor 9 and a decal is attached thereon to mark the longitudinal center of gravity location. In case the decal comes off, a record of "D" (FIG. III) is kept. D (distance from the inner face of the rolling ring 8 to the corrected "C.G." position) equal $e+X_1$.

It is to be understood that the above description is illustrative of this invention and that various modifications thereof can be utilized without departing from its spirit and scope.

Having described the invention, we claim:

A weight and center of gravity computing apparatus comprising, in combination, a load receiving platform for supporting a rocket motor whose weight and center of gravity are to be determined, a plurality of transducers supporting the platform at spaced points and each producing an output voltage which is a function of load applied thereto, a servo system for reading out in analog fashion the output voltage in terms of weight, switch means for connecting the transducers successively in circuit with the servo system, an analog to digital converter for changing the analog readings to electrical digital outputs, an electronic digital computer for controlling the switch means, accepting the converter outputs and computing and recording the total weight and center of gravity of the rocket motor from hand-entered data and the converter outputs, and hold-down means for preventing substantial movement of the platform in the event of accidental firing of the rocket motor.

References Cited by the Examiner
UNITED STATES PATENTS

| | | | |
|---|---|---|---|
| 2,430,702 | 11/1947 | Bohannan | 73—65 |
| 2,630,007 | 3/1953 | Howe et al. | 73—88.5 |
| 2,686,426 | 8/1954 | Kolisch | 73—65 |
| 2,817,971 | 12/1957 | Gruber | 73—462 |
| 2,872,807 | 2/1959 | Kolisch | 73—65 |
| 2,901,171 | 8/1959 | Kolisch | 73—65 |
| 2,936,165 | 5/1960 | Thorsson | 73—141 X |
| 2,944,808 | 7/1960 | Spademan | 177—211 |
| 3,037,376 | 6/1962 | Grant | 73—65 |

OTHER REFERENCES

Page 73, April 28, 1958 issue of the magazine Aviation Week, article titled "Units Test Missile Weight, Balance."

RICHARD C. QUEISSER, *Primary Examiner.*

ROBERT L. EVANS, *Examiner.*